E. C. KENDALL.
APPARATUS FOR SEPARATING LIQUIDS OF DIFFERENT GRAVITIES.
APPLICATION FILED OCT. 12, 1911.
1,036,640.
Patented Aug. 27, 1912.
2 SHEETS—SHEET 1.
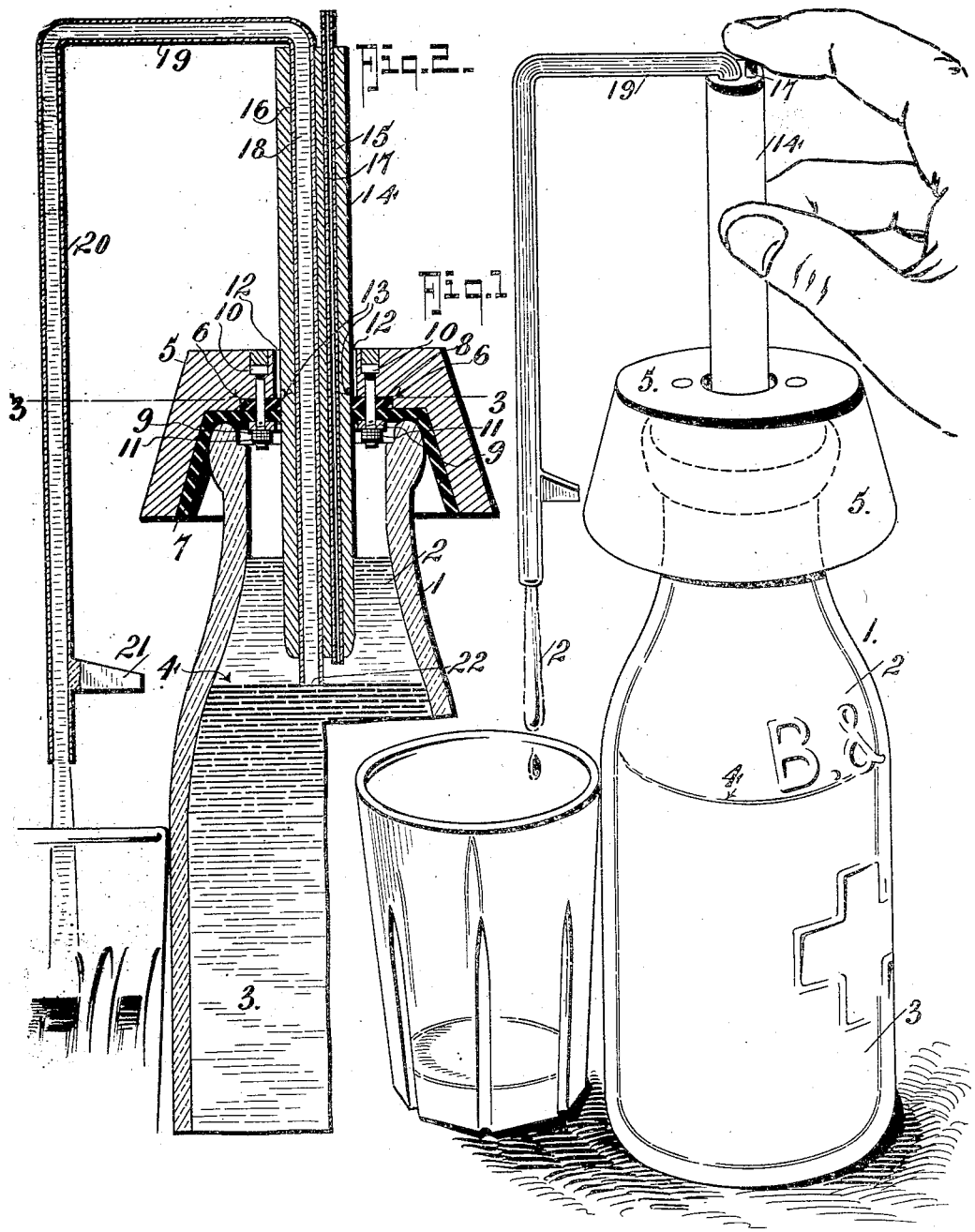
WITNESSES:
John G. Schrott
R. M. Greenwell
INVENTOR
Edward C. Kendall.
BY
H. Winship Wheatley
ATTORNEY.

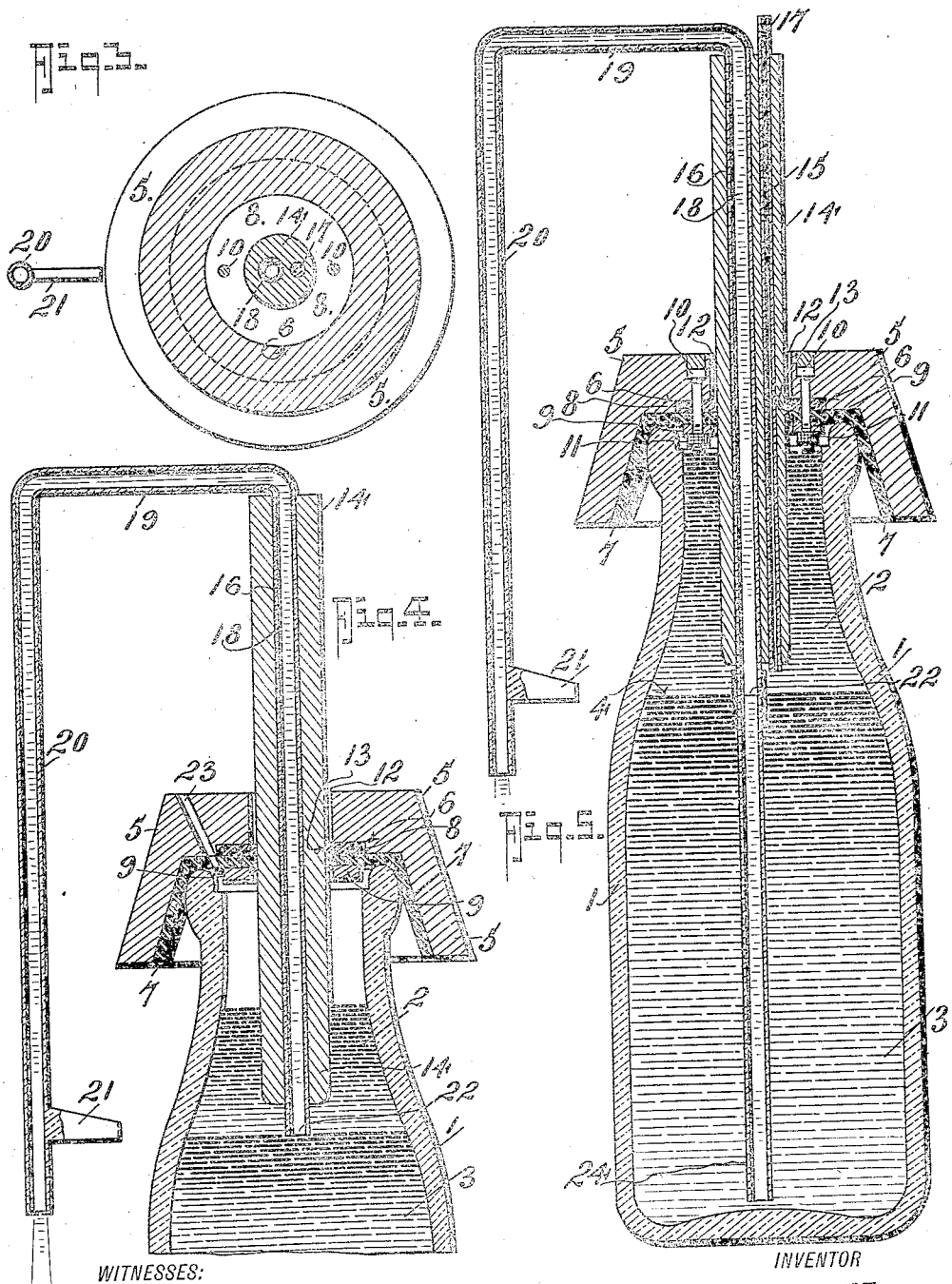

UNITED STATES PATENT OFFICE.

EDWARD CALVIN KENDALL, OF SOUTH NORWALK, CONNECTICUT.

APPARATUS FOR SEPARATING LIQUIDS OF DIFFERENT GRAVITIES.

1,036,640.  Specification of Letters Patent.  Patented Aug. 27, 1912.

Application filed October 12, 1911. Serial No. 654,321.

*To all whom it may concern:*

Be it known that I, EDWARD C. KENDALL, residing at South Norwalk, in the county of Fairfield and State of Connecticut, have invented a new and Improved Apparatus for Separating Liquids of Different Gravities, of which the following is a specification.

The invention is a device for separating liquids of different specific gravities and it particularly is intended for use in removing such liquids from wide mouth bottles by siphonic action, and the invention is particularly adapted to the separation of cream from milk in milk bottles and the like.

In its generic nature the invention provides a siphon for conveying the liquid out of the bottle, and means whereby upon the insertion of the entrant end of the siphon into the bottle, the siphonic action will be automatically established, means being also provided for keeping up the flow of liquid, once the same is started, until the siphonic pressure is stopped.

More specifically the invention provides a cap that is adapted to fit tightly over the mouth of the bottle and has a passage in which a plunger is movable; the plunger carries the siphon tube, and, in one form of invention, it also carries the vent by means of which air is admitted into the bottle after the siphonic pressure has been established, to maintain the same until broken by the uncovering of the inlet to the siphon tube. In a modified form the vent is employed in the cap.

The invention further includes those novel details of construction, combination and arrangement of parts, all of which will be first fully described and then be specifically pointed out in the appended claims, reference being had to the accompanying drawings, in which:—

Figure 1 is a perspective view of one form of the invention, showing the manner of inserting the plunger to establish the siphonic pressure. Fig. 2 is a central vertical longitudinal section of the device with the parts in a position in which the separation is taking place. Fig. 3 is a horizontal section on the line 3—3 of Fig. 2. Fig. 4 is a central vertical longitudinal section of a modification. Fig. 5 is a central vertical longitudinal section of another modification.

Referring now to the accompanying drawings in which like numerals and letters of reference designate like parts in all of the figures, 1 represents the bottle in which the milk and cream is contained. When the bottle is allowed to remain at rest for sometime, the milk and cream separates into two strata the upper, 2 being of lighter specific gravity, and the lower stratum 3, being of heavier specific gravity. The lower stratum represents the milk, and the upper stratum, the cream.

4 designates the plane of separation between the cream 2 and the milk 3.

The construction of the receptacle forms *per se* no part of the invention.

My invention resides in the following mechanism, and consists of a cap 5 to fit over the mouth of the bottle or container 1. In order to effect an air tight closure by the cap it is lined with rubber 7 or other suitable substance, and the cap 5 is provided with a central bore 12 and a counter-sunk recess 6.

8 designates a washer ring of rubber or the like, that is held in the recess by bolts 10 and nuts 11. A ring 9 of metal is employed to coöperate with the bolt 10 and its nut 11 so as to restrict the passage 13, more or less as may be required to effect an air tight contact between the washer 8, the lining 7 and the plunger 14.

14 designates the plunger which is provided with an air tube bore 15 and a siphon tube bore 16 extending longitudinally through the plunger. The air tube bore 15 may be employed by itself or an air tube 17 may be fitted therein and projected upwardly above the siphon tube 19 to enable the air duct or vent to be conveniently closed by the finger of the operator in establishing the siphonic pressure. The siphon tube 19 has its entrant leg 18 mounted in the bore 16 of the plunger 14, while its exit leg portion 20 projects down and terminates in a plane below the plane of the mouth 22 of the entrant leg 18. The leg 20 carries an indicator 21, whose lower edge is in the plane of the mouth 22.

In a modified form of the invention, shown in Fig. 4, the air tube 17 may be omitted and the bore 15 may likewise be omitted, provision being made for the air entrance by an aperture 23 in the cap 5.

In another modified form shown in Fig. 5, an extension tube 24 is connected to the projecting end of the leg 18 of the siphon tube as at 25, the tube 24 being so designed that when the parts are in the position shown in Fig. 5, it will terminate close to the bottom of the bottle 1 so as to siphon out the heavier fluid (milk) first.

In operating the invention, and with particular reference to Fig. 1, the operator inserts the plunger 14 into the passage 12, after placing the cap 5 in position. During the time of the insertion the air tube 17 is held closed as indicated, and the plunger is pressed in until the lighter fluid flows through the siphon, and until the indicator 21 is resting with its straight edge in the plane of separation 4. The operator having thereby established the siphonic pressure to cause the flow of fluid through the siphon tube 19, removes the finger from the air tube 17, thus permitting the continued flow of cream out of the bottle until the mouth 22 of the leg 18 is unsealed by the fluid which is in the bottle, at which time equilibrium will be restored, and the flow of the lighter fluid out of the bottle will cease. The same essential operation takes place in the modified forms, with the exception, in order to stop the flow when the heavier liquid has been removed (see Fig. 5) it will be necessary to close the air vent at the proper time.

From the foregoing description taken in connection with the accompanying drawings, it is believed the complete construction, operation and advantages of this invention will be apparent to those skilled in the art, and while the invention has been particularly described as adapted to the separation of cream and milk, it is obvious that it may be used to separate any fluids of different specific gravities that will separate themselves into a plurality of strata.

What I claim is:—

1. In combination with a fluid container having a mouth, a cap to fit over said mouth, a plunger movable through said cap to establish pressure within the container, and a siphon carried by said plunger, together with a vent for maintaining the flow in the siphon.

2. In combination with a fluid container having a mouth, a closure for said mouth, a siphon for removing fluid from said container, and means for establishing the siphonic flow upon further movement of said siphon after the insertion of said siphon into operative position in said container.

3. In combination with a fluid container, having a mouth, a closure for said mouth, a siphon for removing fluid from said container, and means for carrying said siphon and coöperating with said cap for establishing the siphonic flow upon the insertion of said siphon into said container.

4. In combination with a fluid container having a mouth, a closure for said mouth, a plunger, a siphon tube carried by said plunger, said closure having a passage to receive said plunger, means for effecting an air tight joint between said closure and said plunger, whereby pressure in excess of atmospheric pressure is established in said container by the inward movement of the plunger, thereby forcing the liquid out through said siphon tube, and means for effecting the continuation of said flow after the movement of said plunger has ceased.

5. In combination with a fluid container having a mouth, a closure for said mouth, a plunger, a siphon tube carried by said plunger, said closure having a passage to receive said plunger, means for effecting an air tight joint between said closure and said plunger whereby pressure in excess of atmospheric pressure is established in said container by the inward movement of the plunger, thereby forcing the liquid out through said siphon tube, and means for effecting the continuation of said flow after the movement of said plunger has ceased, said last named means comprising a vent carried by said plunger and adapted to be closed during the insertion of the plunger.

6. In combination with a fluid container having a mouth, a closure for said mouth, a plunger, a siphon tube carried by said plunger, said closure having a passage to receive said plunger, means for effecting an air tight joint between said closure and said plunger whereby pressure in excess of atmospheric pressure is established in said container by the inward movement of the plunger, thereby forcing the liquid out through said siphon tube, and means for effecting the continuation of said flow after the movement of said plunger has ceased, and an indicator coöperative with the entrant end of said siphon and adapted to determine the position of said siphon tube with relation to the plane of separation between the liquids.

7. In a fluid separator, a container having a mouth, a cap for fitting over said mouth, a resilient lining for said cap to effect an air tight closure, said cap having a passage, a washer having a bore and projecting into said passage, a plunger adapted to pass through said passage and said bore, a siphon tube having its entrant leg mounted in said plunger, an indicator on the exit leg of said siphon tube, and having a straight edge to lie in the plane of the mouth of said entrant leg, and means for admitting air into said container after said plunger has been inserted to establish flow through said siphon tube.

8. In a fluid separator, a container having a mouth, a cap for fitting over said mouth, a sealing lining for said cap, said cap having a passage, a washer having a bore and projecting into said passage, a plunger adapted to pass through said passage and said bore, a siphon tube having its entrant leg mounted in and carried by said plunger, and means for applying pressure to said washer to tighten its contact with said plunger and thereby effect an air tight connection between said plunger and said cap, and a vent for maintaining the flow in the siphon when established by insertion of said plunger.

EDWARD CALVIN KENDALL.

Witnesses:
MARK W. NORMAN,
HUGART T. NORMAN.